(12) United States Patent
Bergman et al.

(10) Patent No.: US 7,075,019 B2
(45) Date of Patent: Jul. 11, 2006

(54) MEASURING AND DISPENSING SYSTEM FOR SOLID DRY FLOWABLE MATERIALS

(75) Inventors: Ryan Keith Bergman, Olive Branch, MS (US); Joseph Francis Gerling, West Grove, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 367 days.

(21) Appl. No.: 10/466,127

(22) PCT Filed: Feb. 15, 2002

(86) PCT No.: PCT/US02/04490

§ 371 (c)(1),
(2), (4) Date: Jul. 9, 2003

(87) PCT Pub. No.: WO02/102663

PCT Pub. Date: Dec. 27, 2002

(65) Prior Publication Data
US 2004/0060367 A1 Apr. 1, 2004

Related U.S. Application Data

(60) Provisional application No. 60/270,583, filed on Feb. 20, 2001.

(51) Int. Cl.
*G01G 13/00* (2006.01)
*G01G 13/18* (2006.01)
*G01G 11/08* (2006.01)
*B65B 1/32* (2006.01)

(52) U.S. Cl. ........................ 177/59; 177/105; 222/77; 141/83

(58) Field of Classification Search .................. 141/83, 141/351, 346, 364, 384; 222/55, 56, 77; 177/59, 105–123; 137/552, 613
See application file for complete search history.

(56) References Cited

U.S. PATENT DOCUMENTS

| | | | | |
|---|---|---|---|---|
| 3,498,344 | A | 3/1970 | Schwake et al. | 141/317 |
| 3,502,119 | A | 3/1970 | Sweeney | 141/68 |
| 3,618,684 | A | 11/1971 | Burke et al. | 177/114 |
| 4,488,837 | A * | 12/1984 | Mizokawa et al. | 406/34 |
| 4,614,213 | A | 9/1986 | Englin | 141/59 |
| 4,669,634 | A | 6/1987 | Leroux | 222/53 |
| 5,029,624 | A * | 7/1991 | McCunn et al. | 141/346 |
| 5,466,894 | A | 11/1995 | Naef | 177/59 |
| 5,670,751 | A * | 9/1997 | Hafner | 177/1 |

(Continued)

FOREIGN PATENT DOCUMENTS

CH 683251 A 2/1994

(Continued)

OTHER PUBLICATIONS

XP000687029 Dreschsel D et al., "Gravimetrisch Kontinuerliche Dosierung Keliner Massenstroeme" Wagen Und Dosieren, Verlagsgesellschaft Keppler, Mainz. DE, vol. 28, No. 1, Feb. 1, 1997, pp. 12-20.

*Primary Examiner*—Randy W. Gibson (57) ABSTRACT

An apparatus for measuring and dispensing solid dry flowable materials, comprising a supply container (10), a reserve hopper (18), a means for connecting said supply container (10) to said reserve hopper (18), a means for weighing said reserve hopper (18) and a means for regulating the weight of said material dispensed from said reserve hopper (18).

19 Claims, 9 Drawing Sheets

U.S. PATENT DOCUMENTS

| | | | |
|---|---|---|---|
| 5,738,153 A | 4/1998 | Gerling et al. | 141/83 |
| 5,753,868 A * | 5/1998 | Diem | 177/70 |
| 6,273,153 B1 * | 8/2001 | Reinsch | 141/65 |
| 6,444,926 B1 * | 9/2002 | Ricciardi, Sr. | 177/16 |
| 6,446,836 B1 * | 9/2002 | Aalto et al. | 222/58 |

FOREIGN PATENT DOCUMENTS

| | | |
|---|---|---|
| FR | 2456344 A | 12/1980 |
| JP | 05162701 A | 6/1993 |

* cited by examiner

MEASURING AND DISPENSING SYSTEM FOR SOLID DRY FLOWABLE MATERIALS

FIELD OF THE INVENTION

The present invention relates to a system for measuring and dispensing solid dry flowable materials.

BACKGROUND OF THE INVENTION

Solid dry flowable materials comprise dry, solid particles of sufficient average size that the effect of their weight exceeds surface effects that can cause interparticle attraction and susceptibility to air currents, thereby allowing the particles to flow and be poured, similar to a liquid, such as from container to container. The average size needed for such flowability depends upon a variety of factors including particle density and susceptibility to electrostatic attraction, but typically solid dry flowable materials comprise particles with mean diameters of at least about 100 μm.

Solid dry flowable materials (alternatively referred to simply as "dry flowable materials") include a wide variety of important commodities, including table salt, granulated sugar, sand, gravel, pellets of bulk thermoplastics, etc. For agrochemicals including crop protection agents, such as herbicides, fungicides, bactericides, arthropodicides, nematocides and molluscicides, and also nutrients such as fertilizers, dry flowable compositions have become a favored physical form for active ingredients with physical properties conducive to solid formulation. Like dusts and wettable powders, dry flowable compositions tend to have excellent shelf-life characteristics. Unlike dusts and wettable powders, the granule particles in dry flowable compositions can be easily transferred by pouring, leave little residue in containers, and are generally non-dusty, minimizing possible environmental contamination and inhalation or other exposure hazards. Dry flowable compositions of crop protection agents are also often designed to be water dispersible so that the granule particles break up and disperse on contact with water to form suspensions or solutions for application. Dry flowable compositions of agrochemicals can be prepared by a variety of manufacturing techniques, including fluid bed granulation, pan granulation, spray drying, intensive mixing, paste extrusion, heat extrusion and compaction.

Because dry flowable compositions of agrochemicals are so readily transferable between containers, they facilitate dispensing even relatively large quantities at locations remote from the site of formulation manufacturing. Such remote locations may include distributors' warehouses and farmers' fields. However, particularly because of the high biological activity of agrochemicals, suitable dispensing equipment is needed to ensure amounts of the desired agrochemicals are accurately measured and dispensed, and workers and the environment are not inadvertently contaminated.

U.S. Pat. No. 5,738,153 discloses an apparatus for measuring and dispensing solid dry flowable materials, comprising a refill container containing bulk material, a hopper connected to the refill container by a transfer valve, a transfer container, a control valve to regulate material flow between the hopper and the transfer container, a weighing device supporting the transfer container, and a means for identifying both the refill container and the transfer container to regulate the flow of material between the refill container, hopper and transfer container. This apparatus thus relies upon weighing the transfer container to determine the amount of solid dry flowable material dispensed into the container. While this works well for many needs, particularly with low-use-rate crop protection agents, the required transfer container and weighing device for supporting the transfer container result in some limitations. With agrochemicals entailing high use rates, the appropriately sized transfer container becomes large and heavy when filled, and thus more difficult to handle. Furthermore it may be more expedient to dispense measured quantities of a dry flowable formulation directly into apparatus not comprising a transfer container that can be readily weighed, e.g., a transporting system, a drum for mixing with other agrochemical formulations or a spray tank. For these reasons, an apparatus or system for measuring and dispensing solid dry flowable materials without relying on weighing a transfer container is needed.

SUMMARY OF THE INVENTION

The present invention concerns an apparatus for measuring and dispensing solid dry flowable material, comprising:
  a supply container for holding material;
  a reserve hopper;
  means for connecting said supply container to said reserve hopper;
  means for weighing said reserve hopper;
  means for dispensing material from said reserve hopper; and
  means for regulating the weight of material dispensed from said reserve hopper.

The present invention also concerns a method for measuring and dispensing solid dry flowable material, comprising:
  placing a quantity of solid dry flowable material into the supply container of the apparatus described above;
  discharging a portion of the material therefrom into the reserve hopper of said apparatus;
  weighing the reserve hopper;
  dispensing material from the reserve hopper; and
  regulating the weight of material dispensed from the reserve hopper.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

The invention can be more fully understood upon reference to accompanying drawings, described as follows:

FIG. 2A illustrates the output transfer valve mated with the input transfer valve, and FIG. 2B illustrates the output transfer valve disconnected from the input transfer valve.

FIGS. 5A and 5B are partial, cross-sectional views of one embodiment of the measuring and dispensing apparatus of the present invention illustrating a fastening means for locking an output transfer valve and an input transfer valve together. FIG. 5A shows an unlocked position, and FIG. 5B shows a locked position.

FIGS. 6A and 6B are partial, cross-sectional views of one embodiment of the measuring and dispensing apparatus of the present invention illustrating an output transfer valve capable of enabling one-way material flow. FIG. 6A shows drop pins in a secured position preventing material flow, and FIG. 6B shows drop pins in an unsecured position permitting material flow.

FIGS. 8A and 8B are illustrations of the bottom face of one embodiment of an input transfer valve of a measuring and dispensing apparatus of the present invention. FIG. 8A shows the valve in an open position, and FIG. 8B shows the valve in a closed position.

DETAILED DESCRIPTION OF THE INVENTION

Figure 1:
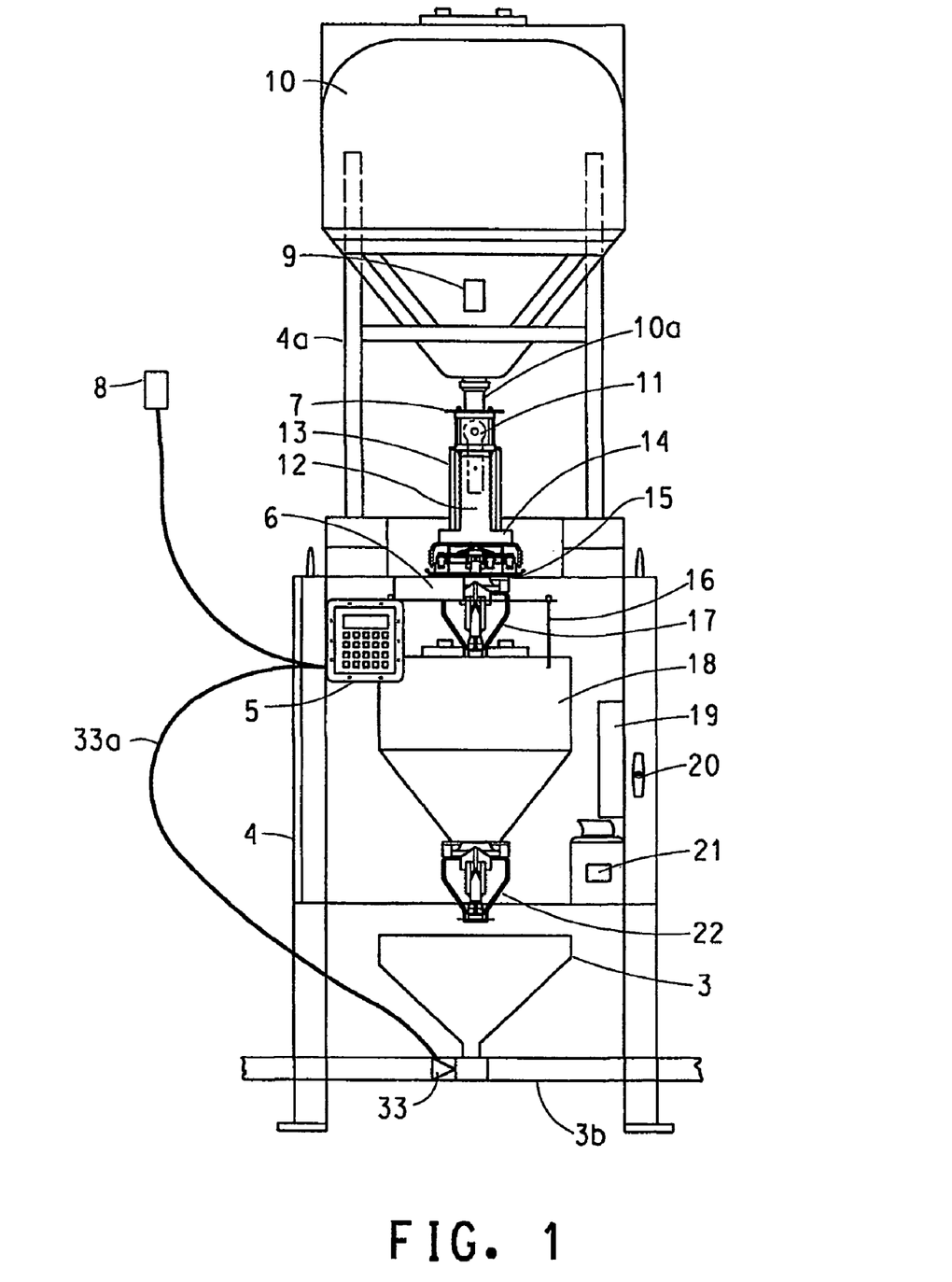
FIG. 1 is a front side view of a measuring and dispensing apparatus in accordance with one embodiment of the present invention and shows a transporting means comprising a hopper and a conduit.

The present invention can be more fully understood from the following detailed description of the invention. FIG. 1 shows a preferred embodiment of an apparatus of the present invention useful for measuring and dispensing solid dry flowable materials.

The apparatus of FIG. 1 comprises supply container 10 which is preferably transportable and/or refillable and is preferably environmentally closed. By "environmentally closed" is meant that any material within supply container 10 and the environment outside supply container 10 are mutually protected from "cross-contamination" and to ensure that supply materials are utilized only for their intended purpose. When assembled within the present apparatus, at least a portion of the sides of supply container 10 preferably slope at an angle which facilitates uniform material flow through output port 10a located at the bottom of supply container 10 to ensure complete emptying of material from supply container 10.

Figure 2A:
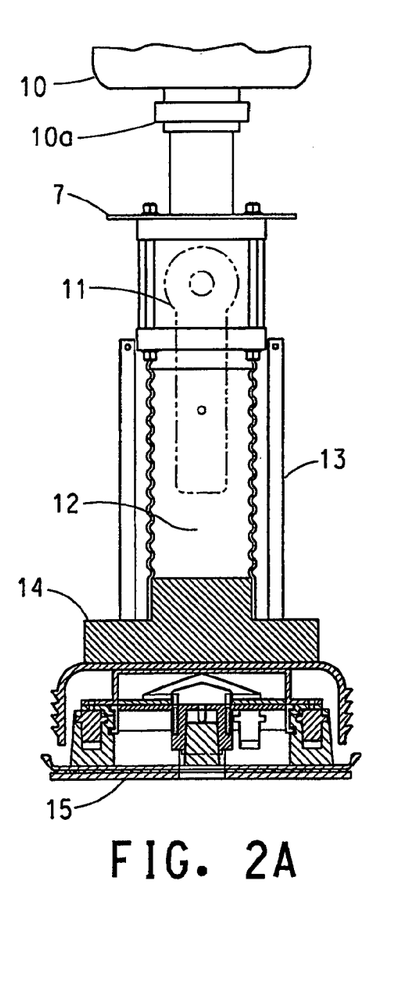
FIGS. 2A and 2B are partial, cross-sectional views of one embodiment of the measuring and dispensing apparatus of the present invention illustrating a means for connecting a supply container to a reserve hopper (not shown) comprising an output transfer valve and an input transfer valve.
Figure 2B:
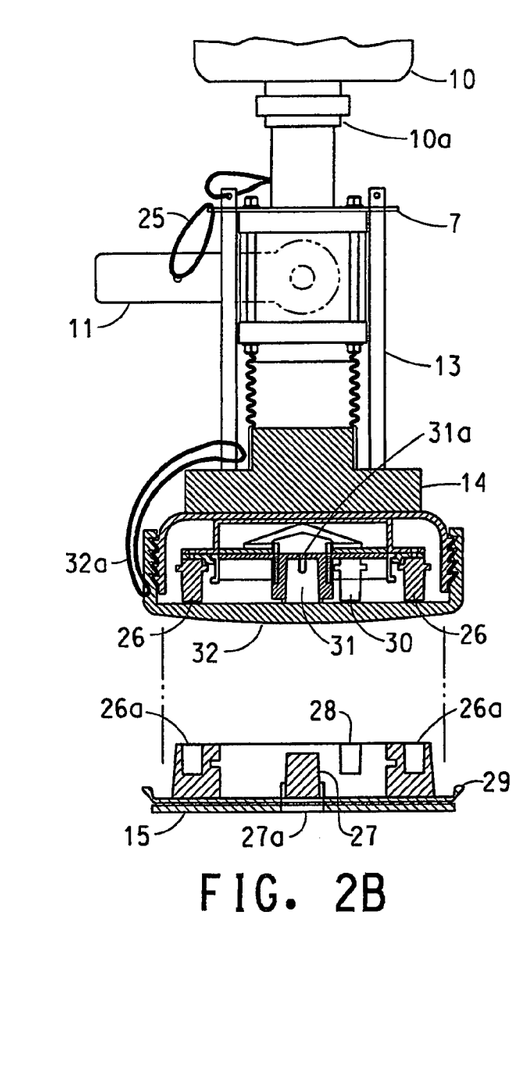

Supply container 10 further comprises shut-off valve 11 in communication with output port 10a. Suitable valve types for shut-off valve 11 include ball, slide gate, disc, rotary and diaphragm designs, with ball type preferred. Shut-off valve 11 can be manual, hydraulically or electrically actuated. FIGS. 1, 2A, 2B and 4 depict shut-off valve 11 as a manual valve having a handle; hydraulically or electrically actuated embodiments of shut-off valve 11 need not have a handle. During shipping of supply container 10, shut-off valve 11 is preferably provided with a tamper-evident seal, such as seal 25 shown in FIG. 2b, to provide product security. With reference to shut-off valve 11, "tamper-evident seal" is meant to be a device rendering opening of shut-off valve 11 impossible without leaving evidence of opening. As shown in FIG. 2B, the placement of the "tamper-evident" device is such that it effectively "seals" the shut-off valve 11 handle in a closed position, so that moving it to an "open" position can be accomplished only by breaking or otherwise "tampering" with the "tamper-evident" device. Tamper-evident seals are well known. Examples of tamper-evident seals include a piece of metal wire or flexible plastic run through holes drilled in the valve handle and a nearby portion of the valve with the metal or plastic ends of the wire or flexible plastic fastened together so that the seal must be cut in order to open the valve. Tamper-evident tape may also be used.

The present apparatus preferably further comprises means for identifying material type, for example a particular agrochemical. Identifying means can comprise one or more identification (I.D.) tags; one or more I.D. readers; and a controller. Thus supply container 10 can further comprise supply I.D. tag 9 to provide identification of material contained therein. Supply I.D. tag 9 can be read by supply I.D. reader 8 that can be connected by wire to controller 5. A variety of technologies exist for providing supply I.D. tag 9 with a unique signature comprising identification information that can be read by supply I.D. reader 8 and electronically processed through controller 5. The signature on the supply I.D. tag 9 may be stored and read by means using optical, magnetic, resistive, conductive and/or radio frequency technologies. Optical means can include scanning a series of dark and light lines, such as a barcode on supply I.D. tag 9. Magnetic means can include a series of individual magnets that can be in place or not; the supply I.D. tag 9 pattern of in place or not is what is sensed. Resistive means can involve measuring the resistance of a component in supply I.D. tag 9. Radio frequency means can involve measuring a preset frequency generated by a circuit on supply I.D. tag 9. Capacitance means can involve measuring the capacitance of a component on supply I.D. tag 9. Magnetic, resistive, conductive and/or radio frequency technologies are preferred over optical, as they are less vulnerable to being effaced during supply container transport and are less vulnerable to circumvention. Supply I.D. reader 8 must be of a type compatible with the particular signature mode being utilized and capable of being positioned so that it can detect that signature and inform the controller of the identity of supply I.D. tag 9. In addition to ensuring product security and preventing cross contamination, the identifying means can further be utilized for automatic inventory updating.

Figure 4:
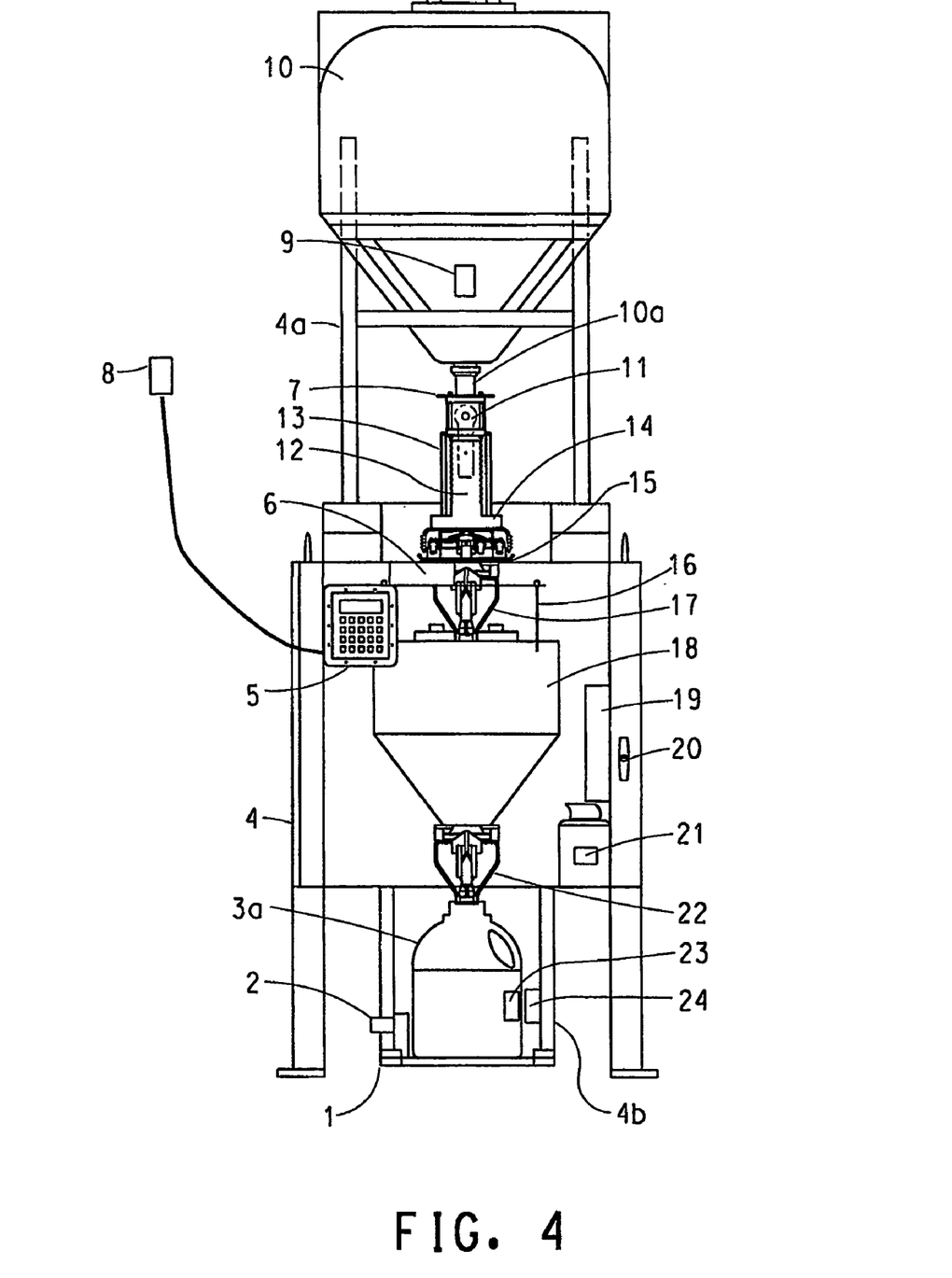
FIG. 4 is a front side view of another embodiment of the measuring and dispensing apparatus of the present invention illustrating the positioning of a product container.

The apparatus of the present invention may further comprise a housing, e.g., cabinet 4. Cabinet 4 preferably comprises at least one door 20. In embodiments of the invention further comprising a product container 3a as shown in FIG. 4, cabinet 4 preferably further comprises movable platform 1 to support the product container and facilitate moving the product container under the dispensing means (shown as dispensing valve 22). In a simple configuration, movable platform 1 moves in one dimension, i.e., slides. The sliding movement can be conveniently provided by mountings using rollers. Using additional components, such as levers, springs and counterweights, moveable platform 1 can also be moved in multiple dimensions, including vertical. Preferably movable platform 1 comprises mechanical guides (not shown), such as alignment pins, to position product container 3a on movable platform 1 so that product container 3a is in transfer communication with the dispensing means (shown as dispensing valve 22) when movable platform 1 is moved into transfer-enabling position. The mechanical guides may be adjustable or relocatable to accommodate varying diameters or widths of product container 3a. Movable platform 1 and/or its mounting supports may be adjustable to accommodate varying heights of product container 3a, and/or shims of appropriate thicknesses may be used to vertically locate opening of product container 3a for transfer communication with the dispensing means (shown as dispensing valve 22). Supply container 10 is preferably supported by cabinet 4.

Between supply container 10 and reserve hopper 18 is disposed means for connecting supply container 10 and reserve hopper 18. Various connecting means are known by those skilled in the art. In the preferred embodiment shown in FIG. 4, the connecting means comprises a conduit for the material which is preferably flexible using a bellows-like structure for ease in attaching and compressible to facilitate its immobilization during shipping, such as shown for flexible hose 12. Alternatively, telescoping plastic or metal, flexible plastic, or woven and coated material can be used in the connecting means. The connecting means preferably further comprises at least one valve to further control the flow of material from supply container 10 to reserve hopper 18. More preferably the connecting means comprises two valves, output transfer valve 14 and input transfer valve 15. Output transfer valve 14 is attached to supply container 10 preferably via flexible hose 12 and is capable of mating with input transfer valve 15. Input transfer valve 15 is disposed between output transfer valve 14 and reserve hopper 18.

Figure 7:
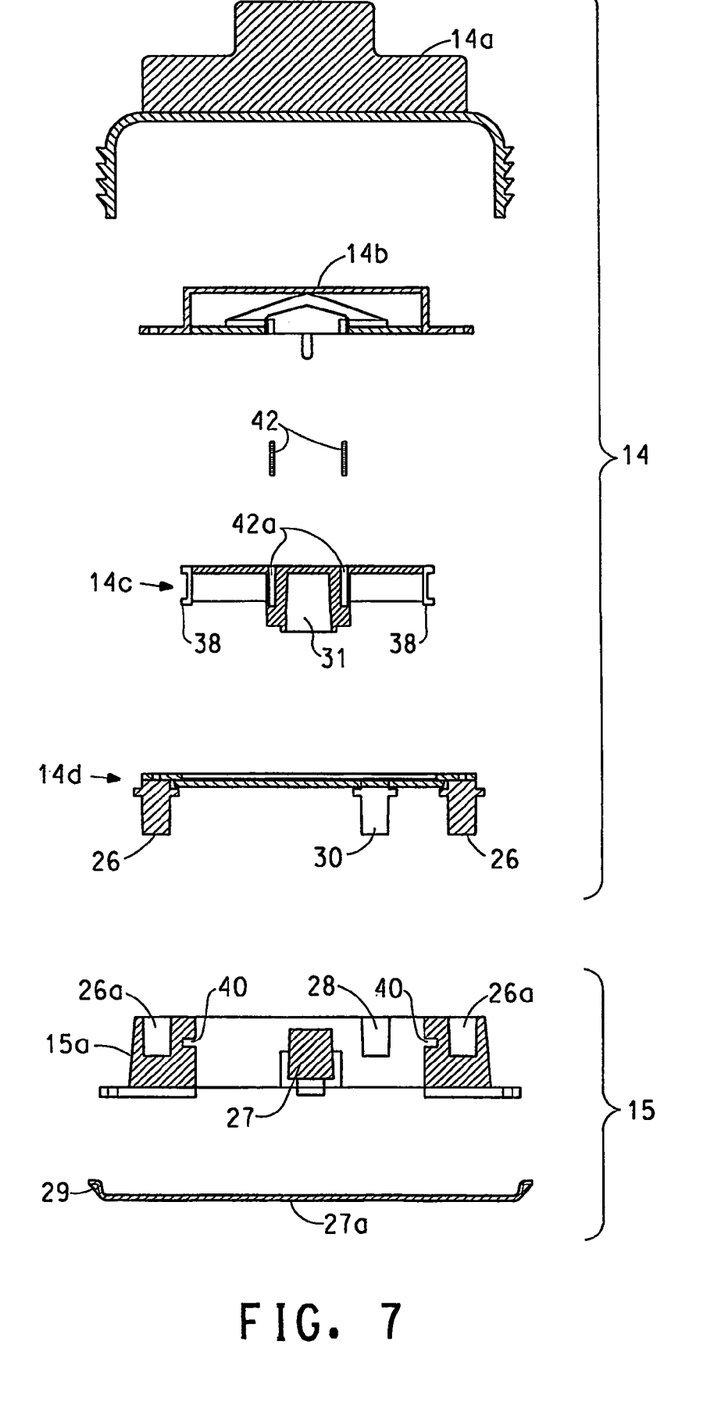
FIG. 7 is an exploded, cross-sectional view of one embodiment of a measuring and dispensing apparatus of the present invention illustrating an output transfer valve and an input transfer valve.
Figure 8A:
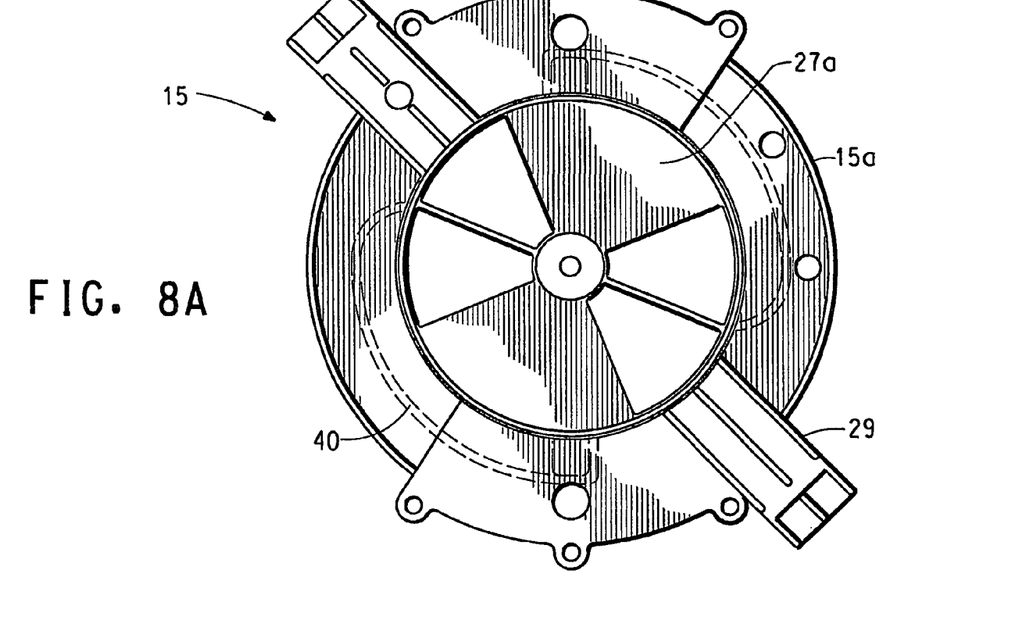
Figure 8B:
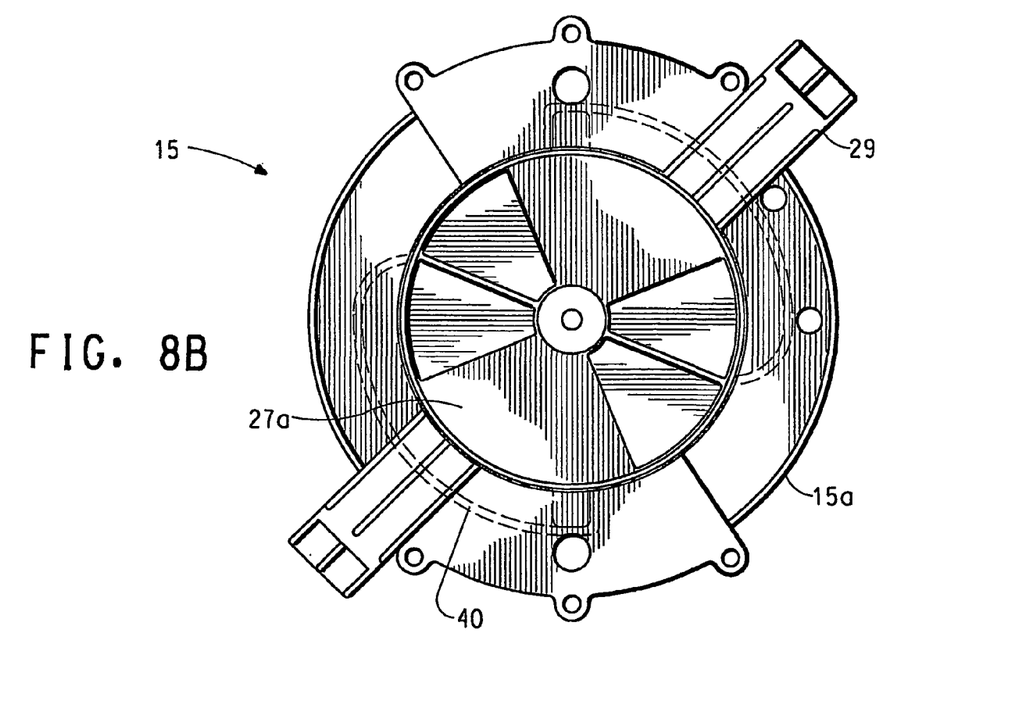

As shown in the exploded view of FIG. 7, output transfer valve 14 comprises outer shell 14a, upper inner unit 14b, drop pins 42, lower inner unit 14c having drop pin cavities 42a which unit corresponds to output slide gate 31a (shown in FIG. 2B), and ring unit 14d. Upper inner unit 14b and lower inner unit 14c with drop pins 42 disposed within drop pin cavities 42a can be fastened together using, for example, one or more bolts and nuts or similar fasteners, such as screws or pins. Input transfer valve 15 comprises inner transfer valve member 15a and valve tab 29 rotatably attached thereto, for example using one or more of a rivet, screw, bolt, nut, nail, pin, or similar fastener. Valve tab 29 must be capable of rotation movement in order to open or close the output and input transfer valves to allow or prevent the flow of material.

Figure 5A:
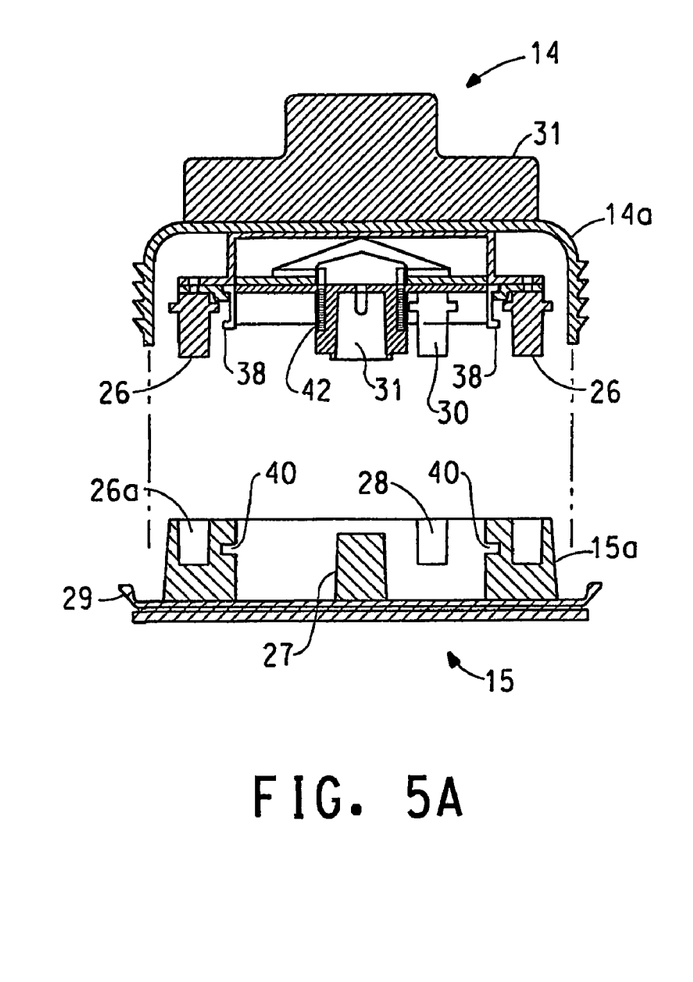

Preferably both input transfer valve 15 and output transfer valve 14 are product specific. By "product specific" is meant a material identity preservation design that is configured uniquely for each specific dry flowable material to be measured and dispensed. The preferred apparatuses of FIG. 1 or FIG. 4 prevent material transfer from supply container 10 if a product-specific output transfer valve 14 is configured for a different dry flowable material than is product-specific input transfer valve 15. A means for configuring valve design to correspond to specific dry flowable materials is by using physical geometry to prevent cooperative coupling of product-specific output and input transfer valves intended for different dry flowable materials. One preferred means of designating and ensuring a specific dry flowable material is used is by utilizing at least one product pin 30 located on product-specific output transfer valve 14 and corresponding product hole 28 located on product-specific input transfer valve 15, as shown in FIGS. 2B and 5A. Product pins 30 and product holes 28 are arranged to ensure that product-specific output transfer valve 14 cannot be mated with product-specific input transfer valve 15 unless product pin 30 properly aligns with hole 28 in product-specific input transfer valve 15. Each arrangement of product pins 30 and complementary arrangement of holes 28 corresponds to a specific dry flowable material. If alignment does not occur, then slide gate key 27 on product-specific input transfer valve 15 will not engage in keyhole 31 in product-specific output transfer valve 14 to allow opening of the coupled input and output transfer valves by rotating valve tab 29. Slide gate key 27 and keyhole 31 have complementary torque-communicating shapes (e.g., hexagonal) such that rotation of rotating valve tab 29 attached to product-specific input slide gate 27a and slide gate key 27 also rotates coupled keyhole 31 and attached product-specific output slide gate 31a so that product-specific output transfer valve 14 and product-specific input transfer valve 15 open and close in unison (see also FIG. 8).

FIG. 2B further shows that output transfer valve 14 preferably utilizes at least one locator pin 26 to ensure proper alignment when connecting to input transfer valve 15 within which resides a corresponding locator hole 26a. Unlike the configurations of product pins 30 and product holes 28, the configurations of locator pins 26 and locator holes 26a do not necessarily correspond to specific dry flowable materials.

Figure 5B:
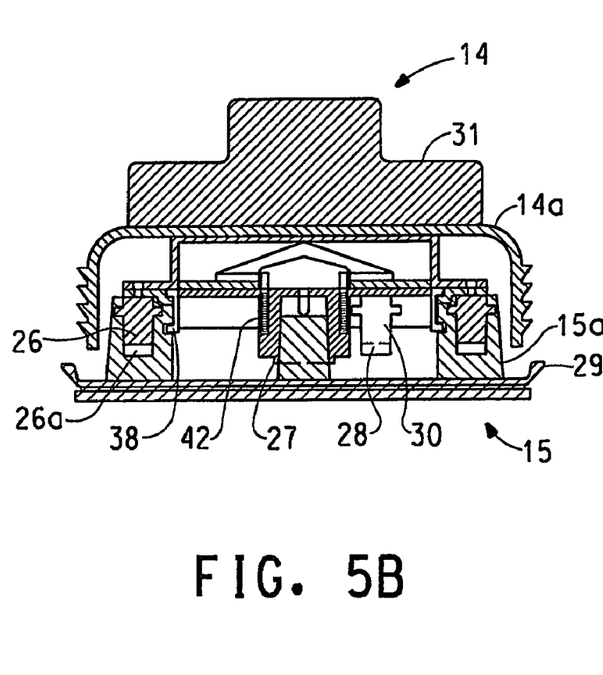

Connecting means preferably further comprises fastening means to clamp or lock output transfer valve 14 and input transfer valve 15 together to prevent their separation and possible spillage of dry flowable material. More preferably, fastening means clamps output transfer valve 14 and input transfer valve 15 together when said valves are opened and unclamps said valves to allow their separation when said valves are closed. One method of fastening (shown in FIGS. 5A and 5B) involves linking rotating valve tab 29 to at least one locking tab 38 that can reversibly enter locking groove 40 in input transfer valve 15 when output transfer valve 14 and input transfer 15 are joined and input transfer valve 15 valve is closed. Movement of rotating valve tab 29 to open input transfer valve 15 and coupled output transfer valve 14 moves linked locking tab 38 of output transfer valve 14 to a position in locking groove 40 of input transfer valve 15 whereby locking groove 40 restrains locking tab 38 to prevent separation.

Figure 6A:
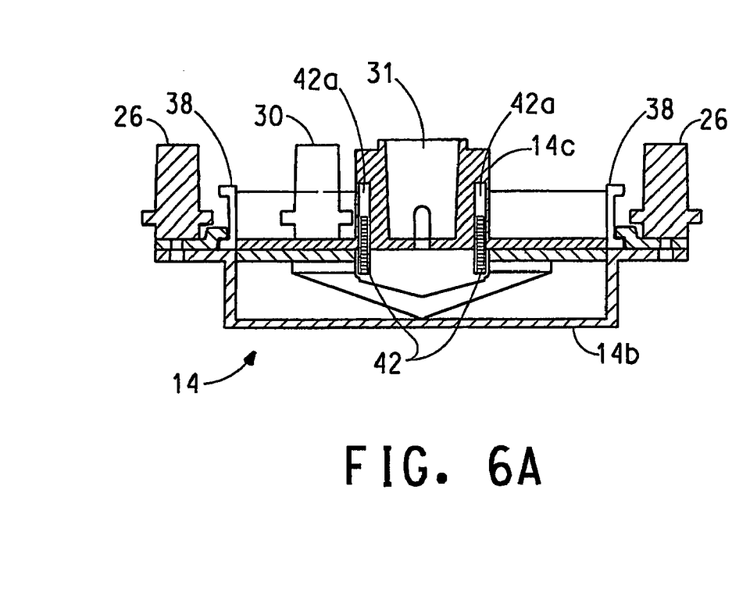
Figure 6B:
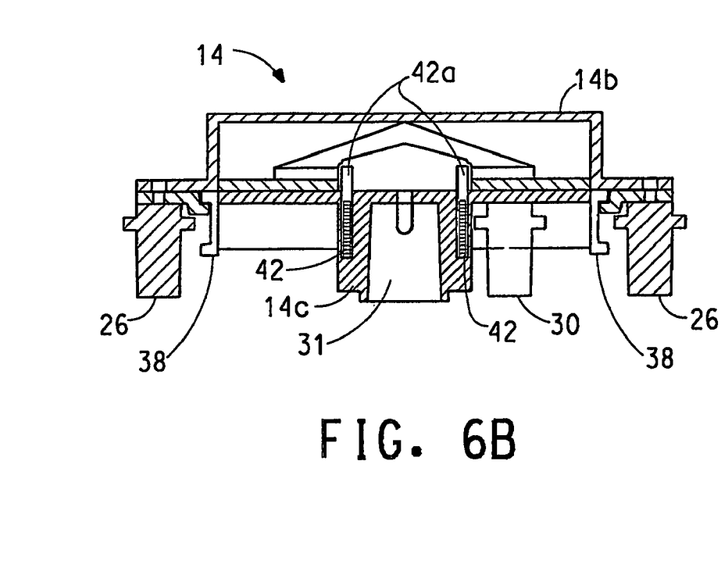

Preferably the output transfer valve is one-way. By "one-way" is meant a valve design that permits flow of material from supply container 10 when supply container 10 and output transfer valve 14 are oriented as shown in FIG. 1 or FIG. 4, but does not permit flow of material into supply container 10 when supply container 10 and output transfer valve 14 are inverted. A "one-way" design can be accomplished using at least one drop pin 42 which moves by gravity within a corresponding cavity, drop pin cavity 42a, formed so that it extends across the boundary between two portions of a valve, upper inner unit 14b and lower inner unit 14c, which must slide by each other in order to create alignment and permit flow of material through them. When the valve is not in the desired orientation (see FIG. 6A), drop pins 42 move by gravity and extend across the said boundary between the sliding valve parts of upper inner unit 14b and lower inner unit 14c and block any movement, thus preventing flow of material through the valve. When the valve is in the desired orientation (see FIG. 6B), drop pins 42 fall below the said boundary and permit movement of the valve parts to enable flow of material. FIGS. 6A and 6B illustrate a preferred embodiment of a one-way material flow design of output transfer valve 14 and product-specific design of output transfer valve 14 and input transfer valve 15.

Flexible hose 12 allows for easy alignment of output transfer valve 14 to input transfer valve 15 when installing supply container 10. Flexible hose 12 is attached to shut-off valve 11 at one end and to an inlet on output transfer valve 14 at the other end. As described above for the preferred product-specific embodiment, output transfer valve 14 can be connected to input transfer valve 15 if locator pins 26 and product pins 30 are aligned with their corresponding holes, locator holes 26a and product holes 28 respectively. If such alignment occurs, the product-specific input transfer valve 15 mates with product-specific output valve 14 to allow for the transfer of material from supply container 10 to reserve hopper 18, as shown in FIGS. 2A and 2B.

During shipment of supply container 10, the mating face of output transfer valve 14 is preferably covered, such as by screw-on shipping cap 32 and further secured with screw-on cap tamper-evident seal 32a (see FIG. 2B). Output transfer valve 14 and flexible hose 12 are preferably held secure during shipment by placing shipping pins 13 into bracket 7.

Figure 9:
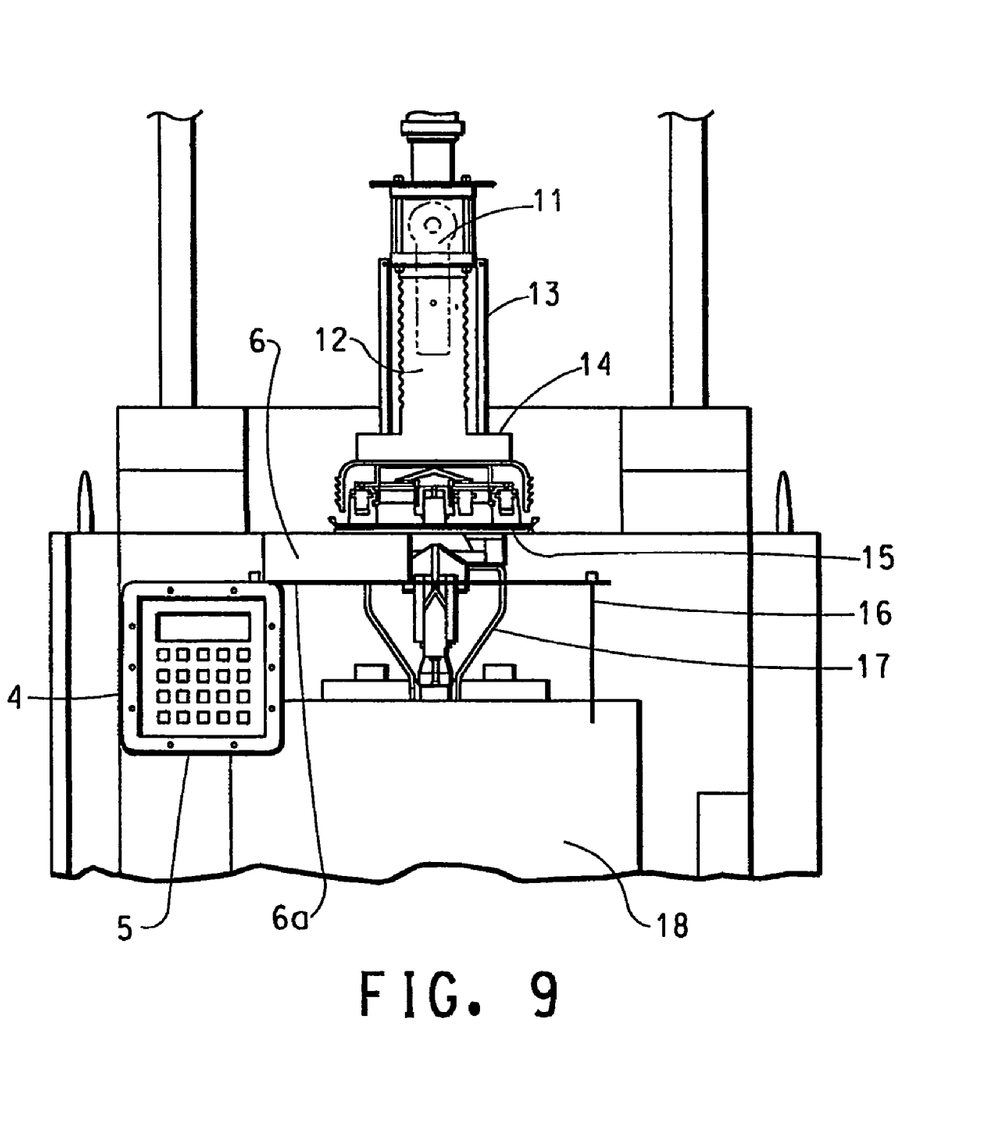
FIG. 9 is a partial, cross-sectional view illustrating one embodiment of a weighing means of a measuring and dispensing apparatus of the present invention.

The apparatus of the present invention includes a reserve hopper and a means for weighing the reserve hopper. One embodiment of these two elements is shown in FIG. 9, wherein reserve hopper 18 is shown in mechanical communication with electronic load cell 6 having bar 6a. In this embodiment electronic load cell 6 and bar 6a act as a cantilever device. As shown in FIG. 9, one end of bar 6a can be securely attached to cabinet 4 or controller 5, such as by one or more bolts or by similar fasteners, and the other end of bar 6a is attached to reserve hopper 18 via bracket 16 which can be a screw, bolt, piece of metal or plastic or similar device threaded into or attached to the top surface of reserve hopper 18. Thus reserve hopper 18 is suspended from bracket 16. Other weighing means can be used and include multiple electronic load cells placed beneath reserve hopper 18, or mechanical systems based on spring tension or on counterweights. The apparatus of the present invention preferably further comprises reserve hopper refill valve 17 disposed between and preferably connected directly to input transfer valve 15 and reserve hopper 18. Both reserve hopper 18 and reserve hopper refill valve 17 preferably reside in cabinet 4, and input transfer valve 15 preferably resides on top of cabinet 4. Reserve hopper refill valve 17 is preferably automatic and electronically controlled to refill reserve hopper 18 to a preset weight after material is dispensed from reserve hopper 18. Refill valve 17 is furthermore preferably designed to enable accurate metering of small quantities of material so as to ensure accurate addition of material into reserve hopper 18 (see FIGS. 3A and 3B).

Figure 3A:
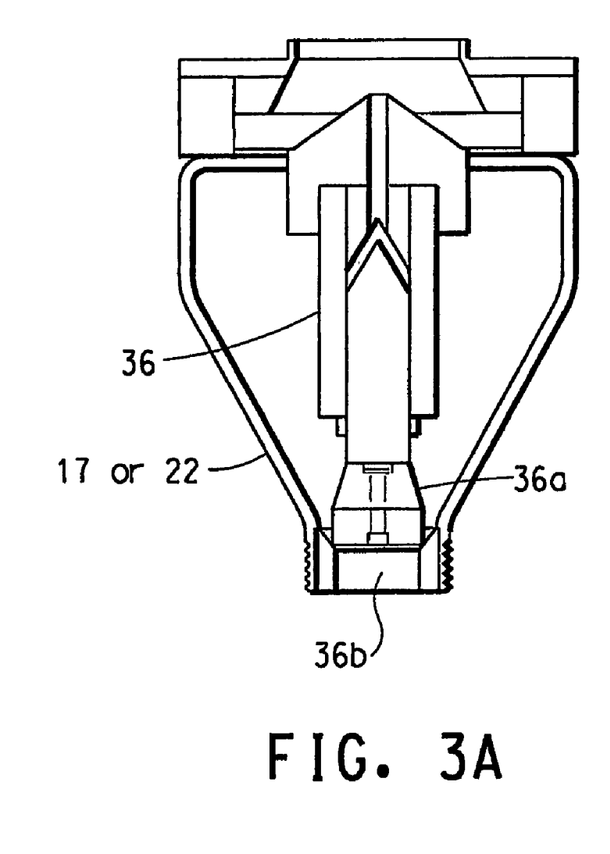
FIG. 3A is a partial, cross-sectional view of one embodiment of the measuring and dispensing apparatus of the present invention illustrating a reserve hopper refill valve or a dispensing valve in a closed position.
Figure 3B:
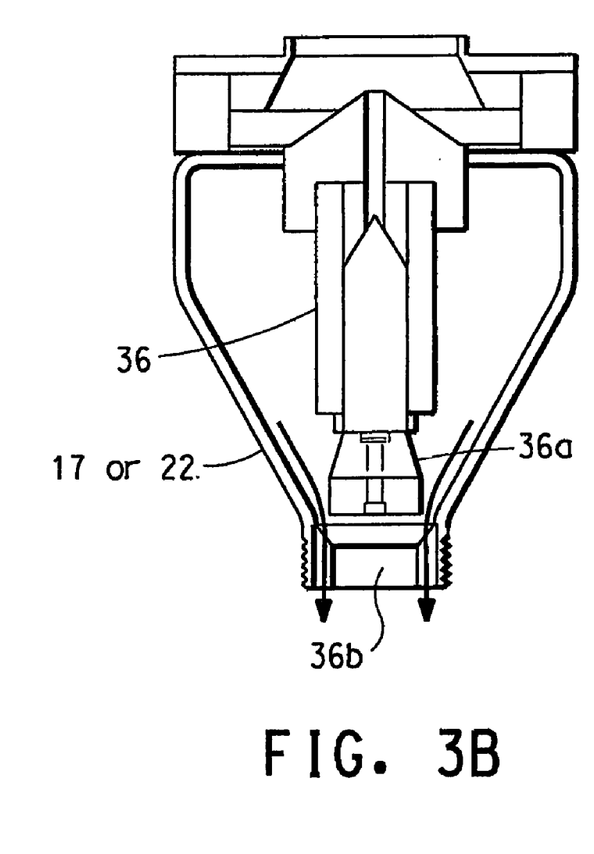
FIG. 3B is a partial, cross-sectional view of one embodiment of the measuring and dispensing apparatus of the present invention illustrating the reserve hopper refill valve or the dispensing valve in an open position.

Connected preferably to the bottom of reserve hopper 18 is means for dispensing the material from reserve hopper 18. The dispensing means must be capable of controlling the material flow from reserve hopper 18. Examples of dispensing means include an electrically or pneumatically actuated ball valve, slide gate valve, rotary valve, disc valve or diaphragm valve, electronically or manually controlled. In FIGS. 1, 3A, 3B, and 4, a preferred dispensing means is shown and comprises dispensing valve 22, which is attached to the bottom of reserve hopper 18. Preferably dispensing valve 22 is electronically controlled but may be manually controlled. Both dispensing valve 22 and reserve hopper refill valve 17 are preferably connected by wires (not shown) to controller 5 and preferably utilize a solenoid, such as preferred magnetic solenoid 36 shown in FIGS. 3A and 3B, to control material flow. Dispensing valve 22 and reserve hopper refill valve 17 preferably have an identical design and are thus interchangeable. FIGS. 3A and 3B show a preferred embodiment of reserve hopper refill valve 17 or dispensing valve 22. Solenoid valve 36 is shown in a closed position in FIG. 3A, e.g. valve stem 36a is seated on valve seat 36b, and in an open position in FIG. 3B, e.g. valve stem 36a is spaced away from valve seat 36b allowing the flow of material therethrough.

Preferably the apparatus of the invention further comprises a means for transporting material wherein the dispensing means is disposed between reserve hopper 18 and the transporting means. The dispensing means transfers material from reserve hopper 18 to the means for transporting material, preferably to an area of application. By "area of application" is meant an apparatus or mechanism through which material is made available for use, a locus where the material is stored in preparation for application or a locus where the material is applied. For instance, in agriculture the area of application can be an applicator's spray tank or a farmer's field. The transporting means can be hydraulic such as a pipe having water or other liquid therein; pneumatic such as a high or low pressure, air or other gas propelled, pneumatic conveying system; mechanical such as an auger; or portable such as a product container. FIG. 1 depicts the transporting means as an inductor comprising hopper 3 and conduit 3b wherein material from hopper 3 feeds into conduit 3b which can transport the material hydraulically via a stream of water or pneumatically via a stream of pressurized air. Transport of material through conduit 3b, preferably to an area of application, is better enabled if there is at least a minimum level of flow of fluid (liquid or gas) through conduit 3b. Therefore, the apparatus of the present invention may further comprise means for monitoring the flow of fluid within the transporting means and communication this data to controller 5. FIG. 1 shows a preferred means for monitoring the flow of fluid comprising flowmeter 33 and connector 33a to transmit readings from flowmeter 33 to controller 5. A variety of monitoring devices exist. Depending on the specific transporting means used, such devices include rotameters, venturi meters, orifice meters, and mass flow meters. Preferred is a meter that can generate an electronic signal, such as a venturi meter.

FIG. 4 shows product container 3a as a preferred transporting means. Product container 3a can further comprise product container I.D. tag 23. Product container I.D. tag 23 is read by product container I.D. reader 24. The identification information signature on the product container I.D. tag 23 may be stored and read by means using optical, magnetic, resistive, conductive and/or radio frequency technologies, involving methods analogous to those already described for supply I.D. tag 9. Magnetic, resistive, conductive and/or radio frequency technologies are preferred over optical, as they are less vulnerable to being effaced during supply container transport and are less vulnerable to circumvention. Product container I.D. reader 24 is preferably installed on movable platform 1 to allow electronically connected controller 5 (connection not shown) to check the product identification of product container I.D. tag 23 on product container 3a to ensure it matches that of supply container I.D. tag 9 and/or product identity previously stored in controller 5, and thus prevent cross contamination. Product container I.D. tag 23 and product container I.D. reader 24 are preferably further used to verify that product container 3a is in an appropriate position relative to dispensing valve 22 to receive material before material is dispensed. Other configurations of product container I.D. tag 23 and product container I.D. reader 24 are possible in which product container I.D. reader 24 is mounted on frame 4b of the apparatus. Such a configuration makes possible detection of movable platform 1 positive closure.

Movable platform solenoid lock 2 actuated by controller 5 is preferably mounted on movable platform 1 to lock movable platform 1 in place while material is being dispensed to prevent a spill.

Means for regulating the amount of material dispensed from reserve hopper 18 is preferably provided via a control mechanism such as controller 5 which preferably comprises input and output means, data processor means and related electronic components. Input means may comprise, for example, push buttons, a numeric or alphanumeric keypad, a touch-sensitive tablet or display screen, or voice recognition. Output means may comprise, for example, indicator lights, a LCD or other display, or voice synthesis. Data processor means typically comprises a central processing unit (CPU) microprocessor or application specific integrated circuit (ASIC) together with memory either on the same semiconductor chip or on other semiconductor components. Controller 5 is preferably mounted in door 20 of cabinet 4. The function of controller 5 further comprises controlling other aspects of the operation of the present apparatus including weighing material, dispensing material, and providing product identification checks by providing a means for inputting operational commands preferably using source code written in C which conserves memory space and therefore space on and weight of the controller. Controller 5 preferably has a non-volatile memory capacity to store records, preferably using Assembly Language, pertaining to dispensing history and preferably further comprises means to transmit records in a form, preferably an Excel spreadsheet, compatible with downloading to a portable computer. Alternatively, a portable computer may be used as controller 5. The apparatus of the present invention preferably further comprises printer 21 for printing a batch ticket for each batch dispensed. Such a printer is preferably mounted inside cabinet 4. Wires (not shown) connect printer 21 to controller 5. One of ordinary skill in the art can provide the programming for performing the various functions described above. Alternatively, the above controller operations can be performed manually by an operator.

This invention provides apparatus well suited for measuring and dispensing solid dry flowable compositions of agrochemicals including crop protection agents, such as herbicides, fungicides, bactericides, arthropodicides, nematocides and molluscicides, and also nutrients such as fertilizers. Accordingly, an apparatus of this invention wherein at least one of the supply container and the reserve hopper contains solid dry flowable material comprising an agrochemical composition is a preferred embodiment of the present invention. Particularly preferred is an apparatus wherein the solid dry flowable material comprises a crop protection agent composition.

The present invention also concerns a method for measuring and dispensing solid dry flowable material comprising placing a quantity of solid dry flowable material into the supply container of the present apparatus described above; discharging a portion of the material therefrom into the reserve hopper of the present apparatus; weighing the reserve hopper; dispensing material from the reserve hopper; and regulating the weight of material dispensed from the reserve hopper. Preferred methods of the present invention utilize the preferred embodiments of the present apparatus for the discharging, weighing, dispensing and regulating steps.

EXAMPLE

To operate a preferred apparatus of the present invention depicted in FIG. 4, an operator first turns on the apparatus using an electrical on/off switch located on power strip 19 connected to controller 5 (connection not shown). Upon powering up, controller 5 displays a request for a Personal Identification Number (PIN). This number which has been previously programmed into controller 5 controls access to the dispensing cycle of the apparatus. Once the operator's PIN number has been entered and accepted, the display advances to the main operating screen which provides access to various routines including a dispensing routine.

When the dispensing routine is selected, a "Job Number" is requested, which is entered by the operator. The Job Number provides a unique identification for each batch dispensed. Once the "Job Number" has been entered, the display prompts the operator to place an empty product container 3*a* on movable platform 1. Movable platform 1 is then slid under dispensing valve 22. Then, the operator is prompted to press "ENTER" on the keypad of controller 5. Movable platform solenoid lock 2 on movable platform 1 is engaged and I.D. tag 23 of product container 3*a* is checked by product container I.D. reader 24 to determine if product container 3*a* product type matches the product which is in supply container 10. If the ID is incorrect, the dispensing routine is interrupted, movable platform solenoid lock 2 is released, and the apparatus returns to the beginning of the dispensing routine. If the ID matches, the routine continues on to a weighing routine, which determined the starting weight of reserve hopper 18.

For the weighing routine, the operator is prompted to enter the weight of product desired to be added to product container 3*a*. The screen then displays the quantity requested and prompts the operator to press the "START" button to open dispensing valve 22 and begin dispensing. The amount of material dispensed is measured by the change in weight of reserve hopper 18 as material is dispensed through dispensing valve 22.

Product is then dispensed into product container 3*a* until the targeted amount minus a preset quantity is reached. The apparatus then proceeds to a topping off routine which dispenses small individual batches of product into the product container 3*a* until the exact targeted amount is reached with a maximum error of ±0.5%. The apparatus then releases movable platform solenoid lock 2, updates the inventory and prints out a batch ticket with the date, time, product name, amount of product dispensed, batch number, job number, dealer name and EPA establishment number on it. The batch ticket is manually attached to product container 3*a* after it is removed from the apparatus.

The apparatus automatically reloads reserve hopper 18 to a preset weight by opening reserve hopper refill valve 17. Once reserve hopper 18 has been reloaded, the apparatus can dispense another batch, be left in standby mode, or be turned off by on/off electrical power switch on power strip 19. If the system is left in standby mode for longer than a preset time limit, it will automatically exit to the PIN input screen.

The main operating screen further provides access to a display of current product inventory and an update inventory routine. The update inventory routine is used when supply container 10 is added to the system. Access to the update inventory routine is protected by a second PIN which can be different from the PIN number entered upon powering up and controls access to inventory updating.

To refill the apparatus when supply container 10 is emptied, a filled supply container 10 is prepared for placement on top of cabinet 4. Preparation of supply container 10 involves breaking screw-on cap tamper-evident seal 32*a* and removing screw-on cap 32. The supply container 10 is then hoisted, inverted and placed and supported on frame 4*a*. Flexible hose 12 is unpinned so it and product-specific output transfer valve 14 to which it is attached, can move freely. Product-specific output transfer valve 14 is then mated with product-specific input transfer valve 15 by ensuring that locator pins 26 fit into locator holes 26a, product pin 30 fits into hole 28 and slide gate key 27 fits into keyhole 31 so that rotating valve tab 29 can be rotated to complete the coupling and locking of product-specific output transfer valve 14 with product-specific input transfer valve 15. The operator selects the "Update Inventory" routine on controller 5, which prompts the operator to use supply I.D. reader 8 to read supply container I.D. tag 9. If the product designation of supply container I.D. tag 9 matches the product designation previously keyed into controller 5 the inventory is updated automatically, and the operator is prompted to open shut-off valve 11 and product-specific output transfer valve 14 coupled to product-specific input transfer valve 15 allowing product to transfer from supply container 10 to reserve hopper 18 through the control of reserve hopper refill valve 17.

What is claimed is:

1. An apparatus for measuring and dispensing solid dry flowable material, comprising:
    a supply container for holding material, said supply container comprising a shut-off valve;
    a reserve hopper;
    means for connecting said supply container to said reserve hopper, said connecting means comprising a flexible, compressible conduit, an output transfer valve, and an input transfer valve, said compressible conduit being attached to the shut-off valve at one end and to an inlet on said output transfer valve at the other end, said output transfer valve capable of attachment to the input transfer valve, said input transfer valve connected to said reserve hopper;
    means for weighing said reserve hopper;
    means for dispensing material from said reserve hopper; and
    means for regulating the weight of material dispensed from said reserve hopper.

2. The apparatus of claim 1 wherein said weighing means comprises a load cell attached to said reserve hopper for measuring the amount of product dispensed from said reserve hopper.

3. The apparatus of claim 1 further comprising a housing.

4. The apparatus of claim 1 wherein said supply container is transportable, refillable and environmentally closed.

5. The apparatus of claim 1 wherein at least a portion of the sides of said supply container slope.

6. The apparatus of claim 1 wherein said conduit is a hose.

7. The apparatus of claim 1 wherein said output transfer valve and input transfer valve are both product specific.

8. The apparatus of claim 1 wherein said output transfer valve is one-way.

9. The apparatus of claim 1 further comprising a reserve hopper refill valve disposed between the input transfer valve and the reserve hopper.

10. The apparatus of claim 1 wherein said regulating means comprises a controller.

11. The apparatus of claim 1 wherein said dispensing means comprises a dispensing valve.

12. The apparatus of claim 11 wherein the dispensing valve is a magnetic solenoid.

13. The apparatus of claim 1 further comprising means for transporting material dispensed from said reserve hopper.

14. The apparatus of claim 13 wherein said transporting means is hydraulic, pneumatic, mechanical or portable.

15. The apparatus of claim 14 wherein said transporting means is a hydraulic or pneumatic conduit.

16. The apparatus of claim 15 further comprising means for monitoring the flow of fluid through said conduit.

17. The apparatus of claim 14 wherein said transporting means is a portable container.

18. The apparatus of claim 17 further comprising means for identifying said supply container and said portable container and means for regulating flow of appropriate materials thereinto.

19. A method for measuring and dispensing solid dry flowable material, comprising:
    placing a quantity of solid dry flowable material into the supply container of an apparatus of claim 1;
    discharging a portion of the material therefrom into the reserve hopper of said apparatus;
    weighing the reserve hopper;
    dispensing material from the reserve hopper; and
    regulating the weight of material dispensed from the reserve hopper.

* * * * *